March 19, 1957  G. A. JEFFREY ET AL  2,785,773
BREAK AWAY VALVE FOR TRACTOR-TRAILER BRAKE SYSTEM
Filed March 24, 1953
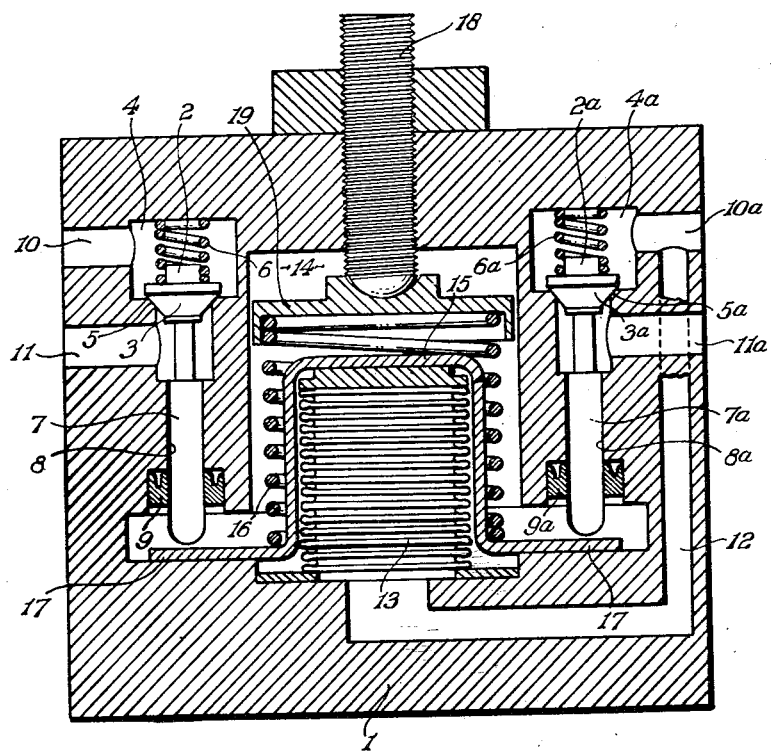
INVENTORS
George Alan Jeffrey
Frederick Henry Thorock
BY
Harris & Bateman
ATTORNEYS

United States Patent Office 2,785,773
Patented Mar. 19, 1957

2,785,773

BREAK AWAY VALVE FOR TRACTOR-TRAILER BRAKE SYSTEM

George Alan Jeffrey and Frederick Henry Heacock, Lincoln, England, assignors to Clayton Dewandre Company Limited, Lincoln, England, a British company Application March 24, 1953, Serial No. 344,374

Claims priority, application Great Britain April 17, 1952

1 Claim. (Cl. 188—3)

This invention relates to braking systems for tractor-trailer road vehicles and has particular reference to fluid-pressure operated braking systems of the kind wherein two pipe lines connect the brake-operating means on the tractor with the brake-operating means on the trailer. In such systems it is common to employ one pipe line, known as the service line, for connecting a brake-operating valve on the tractor vehicle with a valve for operating the brakes on the trailer vehicle at a pressure proportional to the pressure applied to operate the brakes on the tractor vehicle, and a second pipe line, known as the emergency line, for connecting a source of compressed air or vacuum on the tractor vehicle to a reservoir mounted on the trailer vehicle. Stop cocks are provided to seal the pipes on the tractor system when no trailer vehicle is attached.

In such a system as is described in the preceding paragraph the brakes on the trailer vehicle are applied automatically if the trailer breaks away from the tractor, but in such cases the compressed air escapes from the tractor system, or, if the brakes are vacuum-operated, the vacuum is destroyed, and the driver can only bring the tractor vehicle to rest by means of the hand-brake, as it is not practicable to close the stop cocks, which are at the rear of the tractor vehicle, until that vehicle has been brought to rest.

The object of the present invention is to provide an improved control device applicable to tractor-trailer vehicles designed to avoid the disadvantages referred to above and to be capable of easy application to existing vehicles for automatically sealing the air-brake system on the tractor vehicle whenever a trailer vehicle breaks away, thereby enabling the tractor to be controlled and stopped by power assisted braking.

According to the invention a control device for a fluid-pressure operated braking system of the kind described for a tractor-trailer vehicle comprises two valves, one for controlling communication between the brake-operating valve on the tractor and the service line of the trailer, and the other for controlling communication between a source of compressed air or vacuum on the tractor and the emergency line of the trailer, and a pressure-responsive device adapted to be subjected to said source of compressed air or vacuum and operable thereby, above a predetermined pressure or degree of vacuum, so as normally to hold said valves open in order to maintain said communications between the tractor and trailer, whereby said device allows the valves to close upon the interruption of the connections between the tractor and the trailer so as to ensure that compressed air or vacuum is available in the braking system of the tractor for operating the brakes thereof.

Reference will now be made to the accompanying drawing which illustrates in sectional elevation a preferred embodiment of the invention.

In the construction illustrated a device for controlling the application of air-pressure in a tractor-trailer braking system which is adapted to be operated by compressed air comprises a housing 1 in which are situated two valve devices 2, 2a, each valve comprising a coned element 3, 3a movable in a valve chamber 4, 4a but normally held on an annular seat 5, 5a by a spring 6, 6a and having a valve stem 7, 7a which is slidable in a bore 8, 8a in the housing and which projects through a gland 9, 9a into contact with operating means hereinafter described. The valve chamber 4 of the first valve device 2 is adapted to communicate through a passage 10 with the brake operating valve on the tractor which is under pedal control by the driver of the vehicle, and a passage 11 formed in the housing on that side of the valve seat 5 remote from the valve chamber 4 is adapted to communicate with the trailer service line leading to the valve device by which the brakes of the trailer are controlled. The valve chamber 4a of the second valve device 2a is adapted to communicate through a passage 10a with the compressed air reservoir on the tractor, and a passage 11a formed in the housing on that side of the valve seat 5a remote from the valve chamber 4a is adapted to communicate with the trailer emergency line leading to the trailer reservoir. The passage 10a communicating with the reservoir on the tractor also has a branch communication 12 to the interior of a flexible metallic bellows 13 mounted within a chamber 14 in the housing. This bellows is disposed within a cylindrical hood 15 which is movable against the pressure of a spring 16 as the bellows expands and which has a flange or arms 17 projecting laterally beneath the ends of the valve stems. The bellows expands at a predetermined pressure and causes the flange or arms 17 to engage the valve stems and lift the valves off their seatings and thereby create a normal open circuit through the passages 10a and 11a to the trailer reservoir which is consequently charged with compressed air. At the same time communication is established between the tractor service line and the trailer service line via the passages 10 and 11 so that braking pressure may be applied simultaneously in the tractor and trailer braking cylinders under the control of the brake-operating valve on the tractor and a trailer relay valve of known construction.

The spring 16 bearing on the hood 15 surrounding the bellows controls the pressure above which power is transmitted to the trailer, and this pressure can be varied by means of an adjusting device, conveniently a screw-threaded rod 18, which bears upon a plate 19 against the under surface of which bears the spring 16 opposing the movement of the bellows.

If a break-away of the trailer vehicle occurs, the pressure in the system drops until the spring 16 returns the bellows to its inoperative position allowing the separate springs 6 and 6a to close the valves 2 and 2a. This operation shuts off the connection to the trailer whilst leaving the compressed air system in the tractor vehicle intact and enabling that vehicle to be controlled and stopped by air pressure braking.

The arrangement above described is capable of considerable modification. For example, instead of the flexible bellows 13 a piston or diaphragm may be employed while two separate devices responsive to a common source of pressure can be arranged to operate the two valves 2 and 2a.

An example of a braking system to which the invention is applicable comprises a compressor on the tractor vehicle supplying a compressed air reservoir through an unloader valve. The outlet from this reservoir is connected to the pedal-operated brake-valve which is connected to all brake-operating cylinders adjacent the tractor vehicle wheels. The said compressed-air reservoir is also connected through the above-described control device to the emergency line leading from the brake-valve to the reservoir on the trailer vehicle. In addition the pipe-line to the tractor brake-cylinders is also connected through the said control device to the service line leading to the trailer vehicle. The control device forming the subject of the present invention thus replaces the usual stop cocks and couplings between the tractor and trailer vehicles.

It is to be understood, however, that the foregoing description of a braking system is given by way of example only, as the details of the braking arrangements used on tractor-trailer vehicles vary substantially according to the type and make of vehicle.

The invention can also be equally well adapted to a vacuum-operated braking system merely by opening the interior of the bellows 13 to atmosphere, for example, through a port (not shown) in the housing 1, and by constructing the passage 12 so that it opens into the chamber 14 externally of the bellows instead of internally thereof as shown in the drawing and described earlier herein. In the operation of this construction, when the pressure differential over the bellows, due to the evacuation of the chamber 14 externally of the bellows through the passages 12 and 10a, is greater than the force exerted by the spring 16 the bellows expands and so unseats the valve elements 3 and 3a. If a break-away of the trailer vehicle occurs the degree of vacuum in the system diminishes until the pressure differential over the bellows is less than the force of the spring 16 which consequently returns the bellows to its inoperative position and allows the valves 2 and 2a to be closed by their separate springs. This operation shuts off the connection to the trailer, as described earlier herein, whilst leaving sufficient vacuum in the braking system of the tractor to enable it to be controlled and stopped by power-assisted braking.

What we claim is:

In fluid-pressure operated braking means for a tractor-trailer vehicle having service and emergency brake line connections between a source of compressed air on the tractor and brake systems on the tractor and trailer, a control device mounted on the tractor for sealing the brake system on the tractor in the event the trailer breaks away from the tractor, comprising a housing having a chamber therein, a flexible bellows mounted in said chamber and having means of communication between the interior thereof and the source of compressed air and brake system on the tractor and the emergency brake line, a pair of chambers in the housing offset laterally of the bellows and each having a valve seat therein, a pair of parallel spring-closed valves in the pair of chambers and cooperating with the respective valve seats, means of communication between one side of one of said valve seats and the brake system on the tractor and means of communication between the other side of said valve seat and the service brake line connected to the brake system on the trailer and the other valve seat having means of communication between one side thereof and the source of compressed air and means of communication between the other side of said other valve seat and the emergency brake line connected to the trailer, a flanged member extending radially from the bellows and movable by the bellows to engage said pair of valves and to hold them open by expansion of the bellows in response to fluid pressure of a predetermined value in the emergency brake line acting on the bellows, and a spring acting on the bellows to contract it in response to a drop in fluid pressure below said predetermined value acting on the bellows to cause closing of said pair of valves.

References Cited in the file of this patent

UNITED STATES PATENTS

| | | |
|---|---|---|
| 2,216,854 | Sanford | Oct. 8, 1940 |
| 2,335,762 | Hunt et al. | Nov. 30, 1943 |
| 2,451,139 | Williams et al. | Oct. 12, 1948 |
| 2,645,308 | Fitch et al. | July 14, 1953 |

FOREIGN PATENTS

| | | |
|---|---|---|
| 44,050 | Denmark | Apr. 27, 1931 |